United States Patent
Koyama et al.

[15] 3,705,733
[45] Dec. 12, 1972

[54] STEERING HANDLE ATTACHING APPARATUS IN A TWO-WHEELED VEHICLE

[72] Inventors: Mikihiro Koyama, Adachi-machi; Takashi Inagaki, Tokyo, both of Japan

[73] Assignee: Honda Giken Kogyo Kabushiki Kaisha, Tokyo, Japan

[22] Filed: Dec. 9, 1970

[21] Appl. No.: 96,363

[30] Foreign Application Priority Data

Dec. 20, 1969    Japan ....................44/120572

[52] U.S. Cl...................................280/278, 280/279
[51] Int. Cl........................B62k 15/00, B62k 21/24
[58] Field of Search.......280/274, 275, 278, 279, 287

[56] References Cited
UNITED STATES PATENTS 3,295,863   1/1967   Jaulmes....................280/278
1,579,979   4/1926   Wagner.....................280/279
3,427,043   2/1969   Oskam et al...............280/279

*Primary Examiner*—Robert G. Sheridan
*Attorney*—Waters, Roditi, Schwartz & Nissen

[57] ABSTRACT

A steering handle for a two-wheeled vehicle is attached to a support member facing the upper end of a front wheel fork attached to a steering stem. The support member is rotatably mounted on the steering stem and the fork and support member have opposed crenelations which are engageable and disengageable, so that the steering handle support member can be rotated either together with the upper end of the front wheel fork or independently thereof. The support member can be displaced either by a cap threaded on the stem or by a cam member pivoted thereon in order to mesh the crenelations.

5 Claims, 7 Drawing Figures

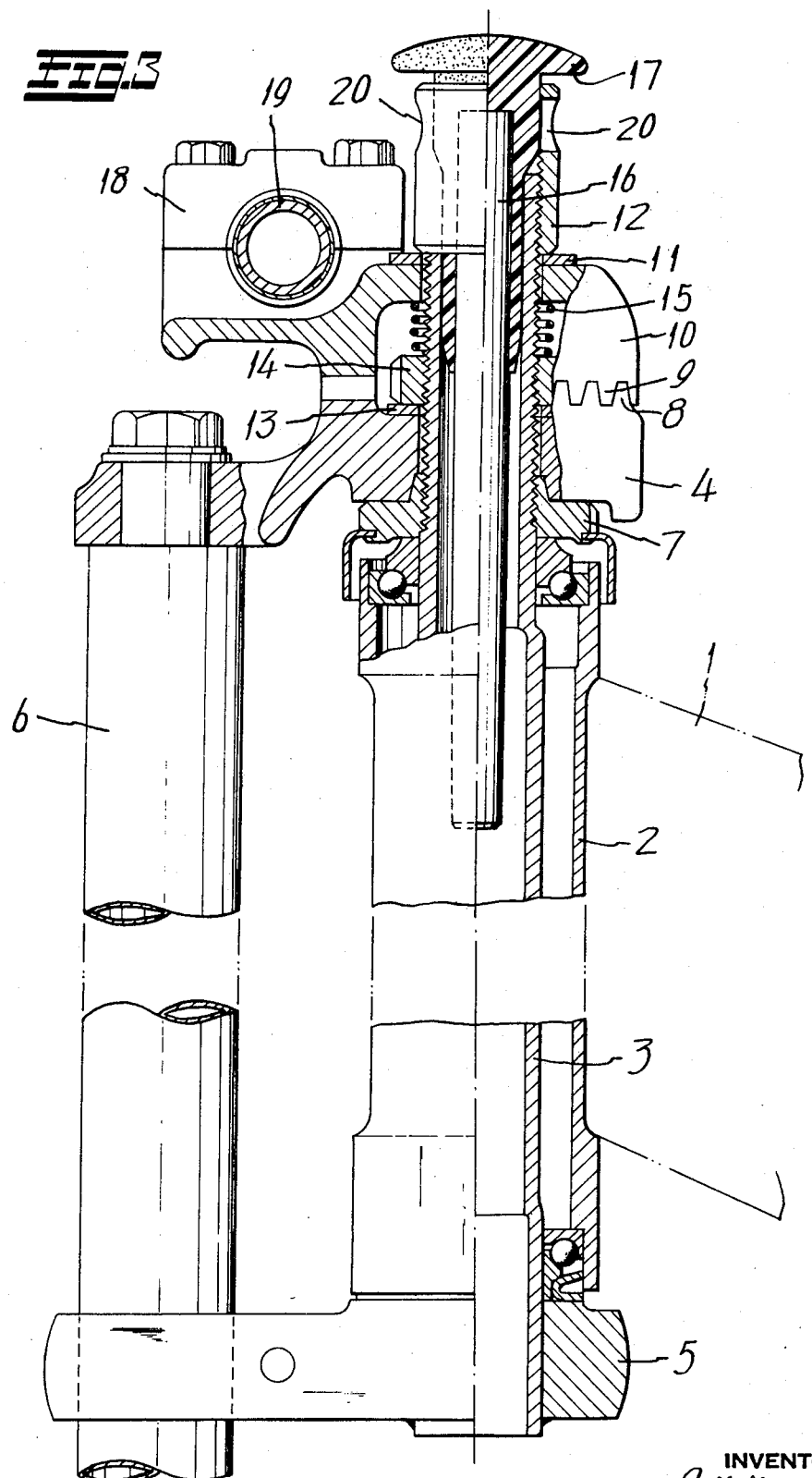

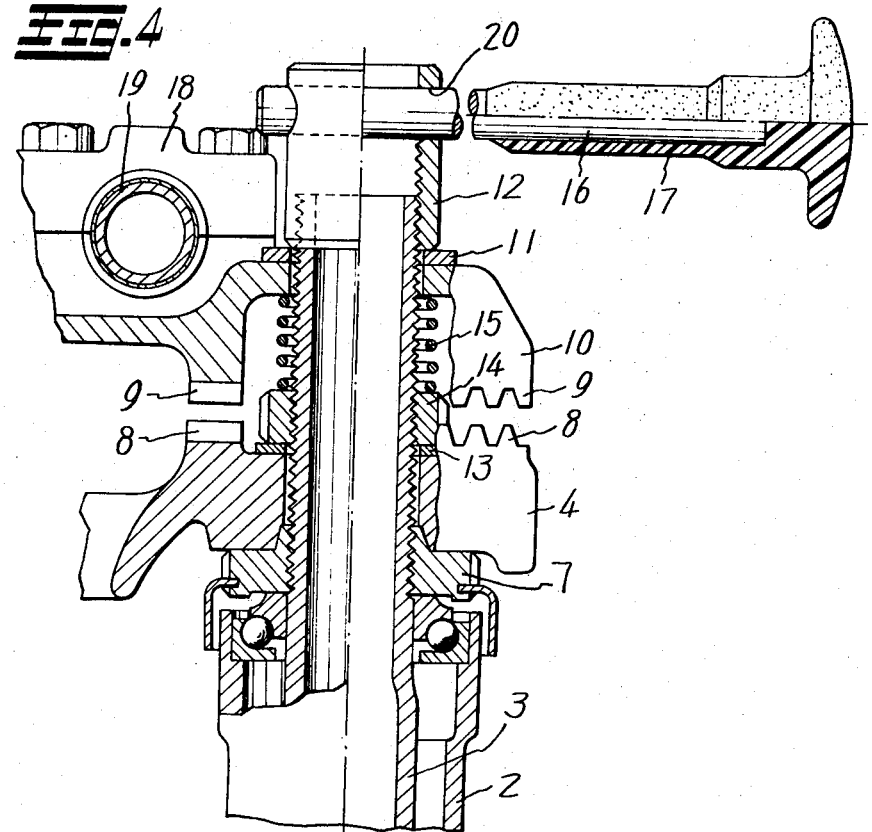
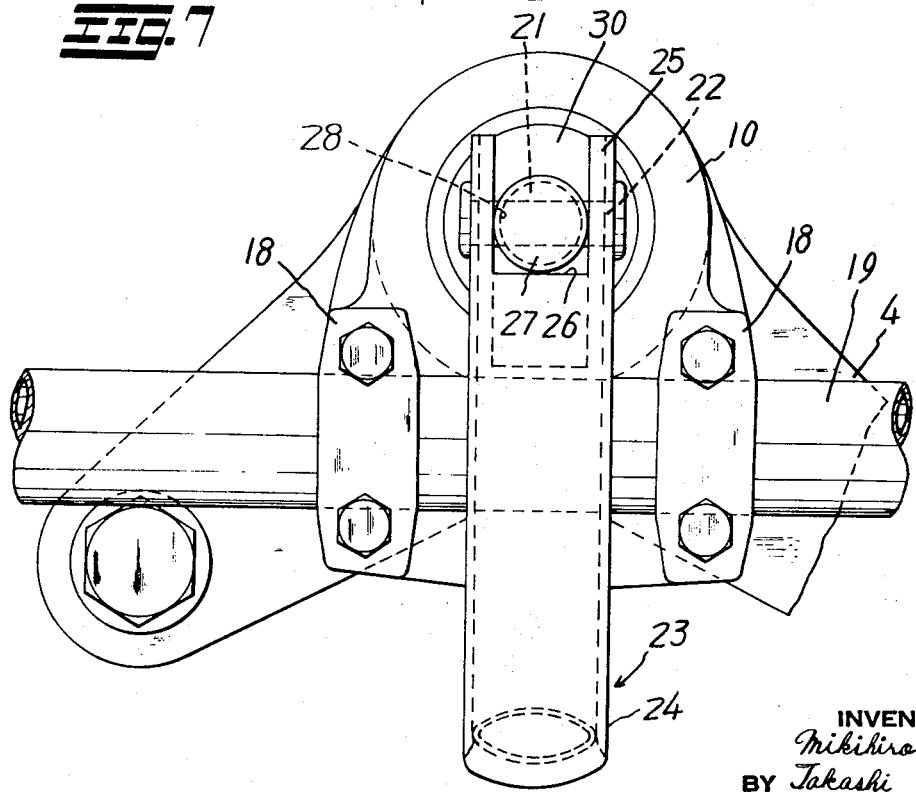

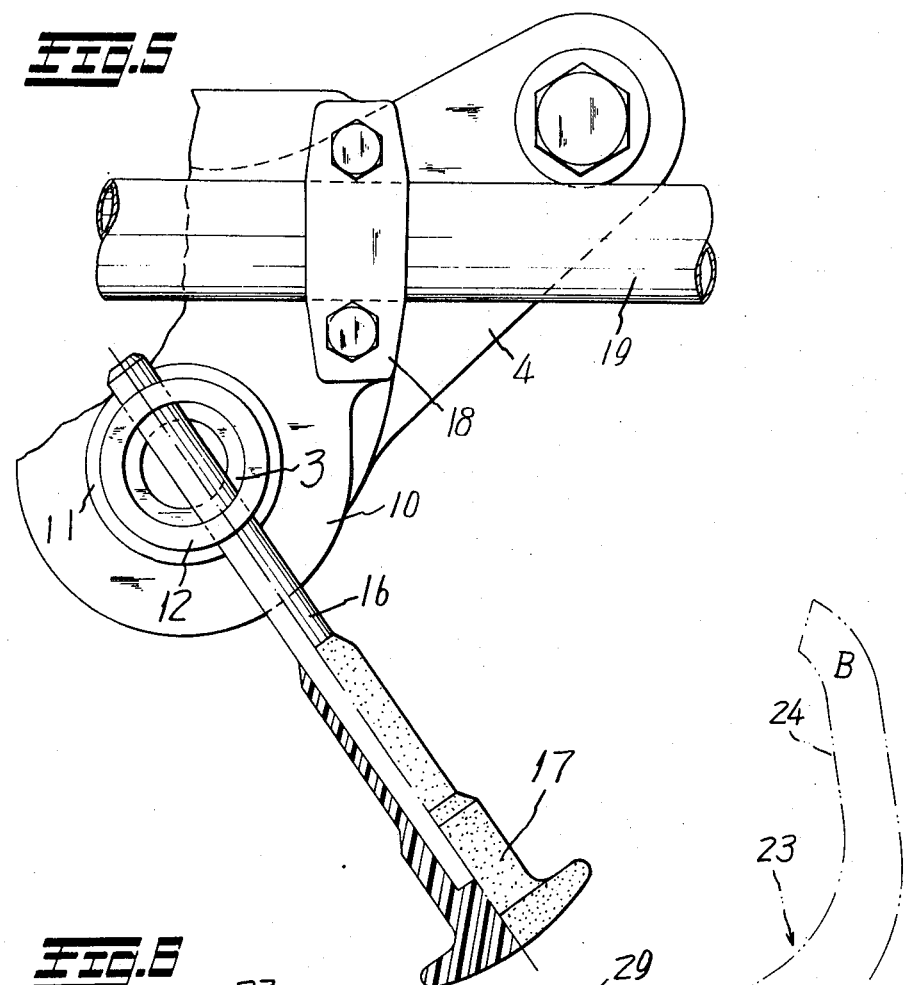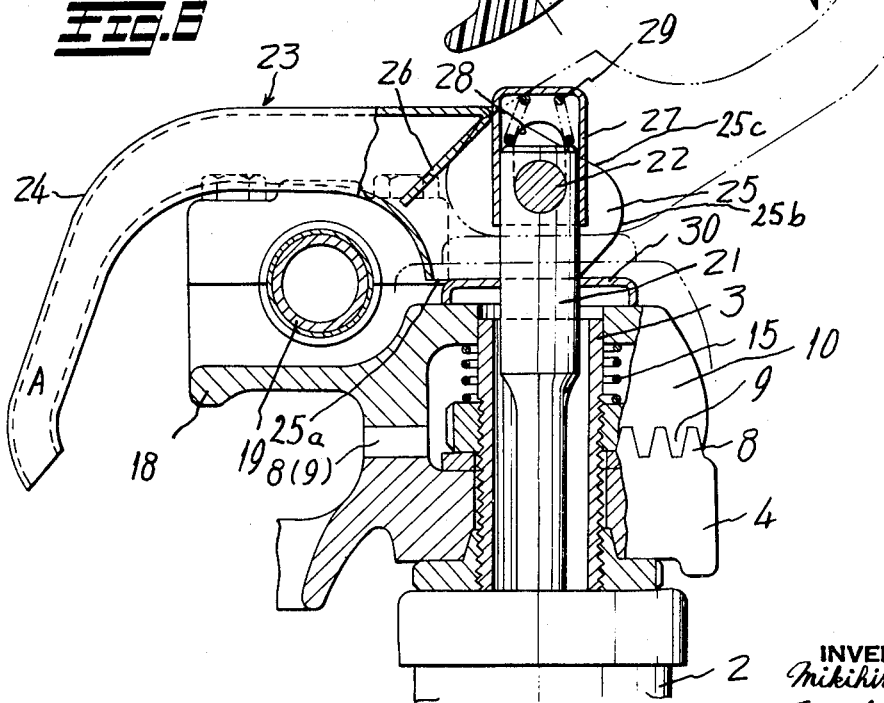

STEERING HANDLE ATTACHING APPARATUS IN A TWO-WHEELED VEHICLE

BRIEF SUMMARY OF THE INVENTION

This invention relates to a steering handle attaching apparatus in a two-wheeled vehicle wherein a steering handle can be rotated so as to be parallel with the vehicle frame and be secured at such rotated position.

In a two-wheeled vehicle, generally the steering handle projects laterally on both sides of the vehicle body, and it is obstructive and is inconvenient for transport, and storage of the vehicle.

An object of this invention is to provide a steering handle attaching apparatus for a two-wheeled vehicle in which the steering handle is rotatably supported, independently of a front wheel fork, on a steering stem provided on a head pipe, so that as occasion demands the steering handle can be rotated so as to be approximately parallel with the vehicle frame and can be maintained at the position for the purpose of transport, or storage of the vehicle.

According to the invention, a support member for steering handle is rotatably mounted on the stem and a coupling means is provided on the fork and support member and has engaged and disengaged positions in which said fork and support member are respectively coupled for common rotation or said support member is rotatable on said stem independently of said fork.

The coupling means comprises opposed portions on the fork and support member having crenelations facing one another and in mesh when the fork and support member are engaged.

An actuating means in the form of a clamp member or cam member serves to move the support member to engage and disengage the facing crenelations.

BRIEF DESCRIPTION OF THE DRAWING

FIG. 3 is a side view, partly in section and on enlarged scale, of a major portion thereof, FIG. 4 is a side view, partly in section of the same portion with the steering handle in a position adapted for rotation, FIG. 5 is a top plan view of the portion in FIG. 4, FIG. 6 is a side view, partly in section of a steering handle attaching apparatus according to another embodiment of the invention, and FIG. 7 is a top plan view thereof.

DETAILED DESCRIPTION

Figure 1:
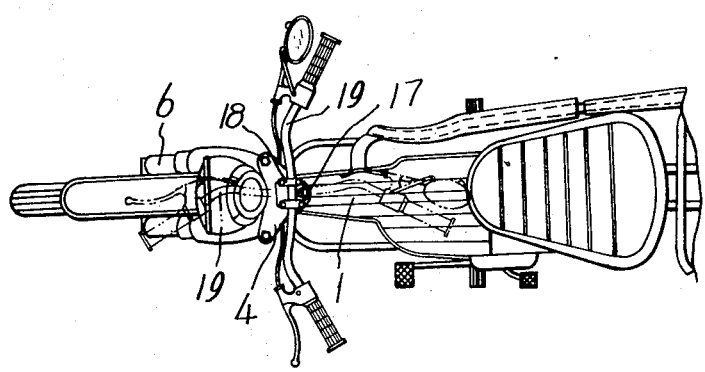
FIG. 1 is a top plan view of part of a two-wheeled vehicle provided with a steering handle attaching apparatus according to one embodiment of this invention.

This invention will now be described with reference to the embodiment in FIGS. 1 to 5.

A front wheel fork 6 is attached through upper and lower bridges 4 and 5 to upper and lower projecting ends of a steering stem 3 rotatably supported by a head pipe 2 provided at the front end of a body frame 1, and the front wheel fork 6 is rotatable to the right and the left in relation to the head pipe 2.

The head pipe 2 is held from above and below by the lower bridge 5 and a nut 7 threaded on the upper portion of the steering stem 3 so that the steering stem 3 is not movable in the axial direction thereof. The upper surface of the upper bridge 4 is formed with crenelations 8.

Mounted on the steering stem 3 above the nut 7 is a steering handle supporting member 10 whose lower surface is formed with crenelations 9 which can be meshed with crenelations 8. A cap 12 is threaded on the upper end of the steering stem 3 through the intermediary of a washer 11, so that by threadably advancing cap 12, the crenelations 8 of upper bridge 4 and the crenelations 9 of the steering handle supporting member 10 can be locked in mesh with one another.

The cap 12 is open at its top end and is provided with a lateral hole 20 passing therethrough.

Between the upper bridge 4 and the steering handle supporting member 10, there is interposed a compression spring 15 through the intermediary of a washer 13 and a nut 14 screwed on the steering stem 3, and compression spring 15 opposes the engagement between crenelations 8 and 9. A clamp handle 16 is removably inserted in the upper open end portion of the cap 12 as seen in FIG. 3 so as to extend through the cap 12 into the steering stem 3, and a holding member 17 made of an elastic material such as synthetic resin, rubber or the like is attached to the outer end of the clamp handle 16, the holding member 17 being inserted frictionally into the cap 12 for closing the open portion thereof.

The steering handle supporting member 10 is provided with a pair of bearing portions 18, and a steering handle 19 can be supported by bearing portions 18.

Figure 2:
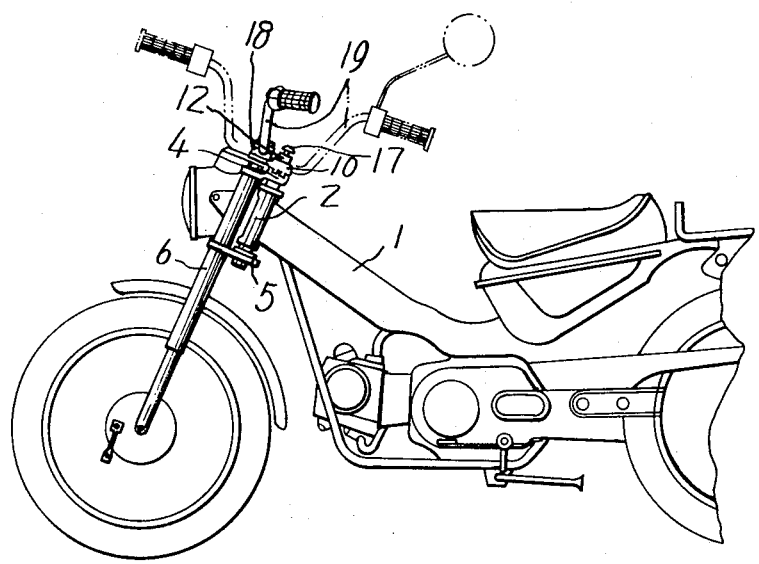
FIG. 2 is a side elevational view of the same.

If it is now intended that the steering handle 19 be rotated from the solid line position to the broken line position as shown in FIGS. 1 and 2, that is, from a driving position to a storage position, the clamp handle 16 as shown in FIG. 3 is pulled outwards by overcoming the frictional force between the holding member 17 and the cap 12, and then the clamp handle 16 is inserted in the lateral hole 20 of the cap 12 as shown in FIG. 4, and the cap 12 is rotated in its loosening direction. Thereby, the cap 12 is moved upwards and the tightening action thereof is released, and the steering handle supporting member 10 is elevated by the action of the compression spring 15 whereby the crenelations 9 are released from the crenelations 8 on the upper surface of the upper bridge 4. Accordingly, the steering handle supporting member 10 can now be freely rotated about the steering stem 3 in relation to the front wheel fork 6 and can be rotated to its storage position as shown in broken lines in FIGS. 1 and 2.

After the steering handle supporting member 10 has been rotated to its storage position, if the clamp handle 16 is again rotated in its tightening direction, then, the screw cap 12 is lowered against the action of the compression spring 15 and the crenelations 8 and 9 are brought into mesh with each other, whereby the upper bridge 4 and the steering handle supporting member 10 are secured to one another and the steering handle 19 can be maintained in its storage position, that is, in a position parallel with the body frame 1. Thereafter, the clamp handle 16 is removed from the lateral opening 20 of the cap 12 and the handle 16 is inserted in the upper open portion of the cap 12 so as to be frictionally held in the cap 12 by the holding member 17.

For returning the steering handle 12 to its driving position, it is only necessary to repeat the same operation as described above but in reverse.

In order that the steering handle 19 is rotated to its driving position correctly, the upper bridge 4 and the steering handle supporting member 10 are provided with suitable respective marks which are caused to coincide with one another so that the positioning thereof can become simplified.

Another embodiment of this invention will now be described with reference to FIGS. 6 and 7. Structure herein which is the same as in the embodiment of FIGS 1–5 is given the same reference numerals.

This embodiment is of a construction in which the engagement and disengagement between the upper bridge 4 and the steering handle supporting member 10 many be effected by a single operation of a cam handle 23, instead of the rotation of the cap 12 in the foregoing embodiment. Namely, a supporting shaft 21 of a tension bolt type is inserted through the steering stem 3 and is fixed at its lower end to the steering stem 3. The upper end of the supporting shaft 21 projects above member 10 and the cam handle 23 is rotatably attached to the top end thereof through a pivot 22, and a stopper member 26 which is to be engaged with a cap 27 on shaft 21 is provided at the boundary between a handle portion 24 and a cam portion 25 of the cam handle 23. A first cam surface 25a and a second cam surface 25c are smoothly joined by an intermediate cam surface 25b, so that even if the cam handle 23 is located at any rotated position, one of the foregoing cam surfaces is certain to face a receiving member 30 provided on the upper surface of the steering handle supporting member 10 for being subjected to a pressure contact with the upper surface of the receiving member 30 by the action of the compression spring 15. The cam surface 25a is located a greater distance from pivot 22 than cam surface 25c.

The cap 27 is mounted on the top end of the shaft 21, and is also slidably mounted, at slots 28 in both side surfaces thereof, on the pivot 22, so that the cap 27 can be moved up and down within the range of the length of the slots 28. A compression spring 29 is interposed between the supporting shaft 21 and the cap 27 and this spring 29 serves to keep the cap 27 at its elevated position.

When the cam handle 23 is located at its tightening position A and the cap 27 is located at its elevated position as shown in FIG. 6, one end of the stopper member 26 is in engagement with the side surface of the cap 27 and accordingly the cam handle 23 cannot be rotated in this condition.

If, now, the cap 27 is pushed downwards by a finger action or the like against the opposition of the compression spring 29 in FIG. 6, the cap 27 is released from its engagement with the stopper member 26, so that the cam handle 23 can be freely rotated. If the cam handle 23 is rotated from its tightening position A to its releasing position B, the cam surface 25c of the cam portion 25 comes to face the upper surface of the receiving member 30, so that the steering handle supporting member 10 is elevated by the action of the compression spring 15 and accordingly the engagement between the crenelations 8 and 9 is released and thus the steering handle supporting member 10 can be freely rotated in the same manner as in the foregoing embodiment. If the cam handle 23 is again returned to its tightening position A after the steering handle supporting member 10 is rotated to its storage position, the cam surface 25a of the cam portion 25 comes to face the upper surface of the receiving member 30, and thereby the steering handle supporting member 10 is lowered against the action of the compression spring 15, and the crenelations 8 and 9 are meshed one with another, whereby the upper bridge 4 and the steering handle supporting member 10 are secured to one with another and the steering handle supporting member 10 can be maintained in its storage position.

For again returning the steering handle 19 to its driving position, it is only necessary that the same operation as above be repeated.

When the cam handle 23 is located at the middle position between the tightening position A and the releasing position B, that is, at such a position that the intermediate cam surface faces the receiving member 30, the engagement between the crenelations 8 and 9 is slightly released but not entirely disengaged.

According to this invention, the steering handle supporting member is rotatable separate from the front wheel fork, on the steering stem and the same is arranged to be engageable and disengageable with the front wheel attached to the steering stem, so that the steering handle supporting member can be independently rotatable at will and it is possible that as occasion demands the supporting member can be rotated so as to be substantially parallel to the frame and be held at that position, and thus it is convenient for storage and transport of the vehicle.

What is claimed is:

1. In a two wheel vehicle having a frame with a head pipe, and a steering stem rotatably mounted in the head pipe, an improvement comprising a front wheel fork attached to said steering stem for rotation therewith, a support member for a steering handle rotatably mounted on said stem, coupling means on said fork and support member having engaged and disengaged positions in which said fork and support member are respectively coupled for common rotation or said support member is rotatable on said stem independently of said fork, actuating means acting on said support member for engaging and disengaging the same and said fork, said actuating means comprising a cam handle pivotably supported with respect to the stem and acting on said support member to displace the same to engage the fork, said coupling means comprising opposed portions on said fork and support member having crenelations facing one another which are in meshed engagement when the fork and support member are in engaged position.

2. An improvement as claimed in claim 1 comprising resilient means between said fork and support member apart to the disengaged position, said actuating means acting on the support member to overcome the opposition of the resilient means.

3. An improvement as claimed in claim 1 wherein said stem is hollow and further comprising a support shaft secured to said stem and extending through said stem, said cam handle being pivotably mounted on the support shaft.

4. An improvement as claimed in claim 3 wherein said cam handle includes a cam portion constituted by first and second cam surfaces located at different distances from the pivot axis of the cam handle relative to the stem and an intermediate cam surface smoothly joining the first and second cam surfaces.

5. An improvement as claimed in claim 3 comprising a slidable cap on said support shaft, and a stopper member on said cam handle engaged with said cap to prevent pivotal movement of the cam handle, said cap being slidable to a position in which said stopper member is released and the cam handle can be pivotably moved.

* * * * *